United States Patent [19]
Weld

[11] 4,294,393
[45] Oct. 13, 1981

[54] METHOD OF MANUFACTURING A WIRE SPOKE AUTOMOTIVE WHEEL

[75] Inventor: Richard G. Weld, Independence, Mo.

[73] Assignee: Weldwheels, Inc., Kansas City, Mo.

[21] Appl. No.: 79,962

[22] Filed: Sep. 28, 1979

Related U.S. Application Data

[62] Division of Ser. No. 918,606, Jun. 23, 1978, Pat. No. 4,226,479.

[51] Int. Cl.³ .............................................. B23K 31/00
[52] U.S. Cl. ................................. 228/134; 29/159.03; 228/165
[58] Field of Search .............. 228/256, 134, 165, 244; 219/60.2, 125.11; 29/159.02, 159.03

[56] References Cited

U.S. PATENT DOCUMENTS

| | | | |
|---|---|---|---|
| 294,722 | 3/1884 | Burdon | 228/134 |
| 2,721,379 | 10/1955 | Chapman | 228/134 X |
| 3,777,110 | 12/1973 | Yohn et al. | 219/60.2 |

FOREIGN PATENT DOCUMENTS

| | | | |
|---|---|---|---|
| 836084 | 6/1960 | United Kingdom | 219/60.2 |

*Primary Examiner*—Richard B. Lazarus
*Attorney, Agent, or Firm*—Fishburn, Gold and Litman

[57] ABSTRACT

A wire spoke, non-suspension type, automotive wheel in which the spokes are operably untensioned prior to vehicle loads being placed upon the wheel. An outer tubeless tire rim with a drop center is mounted to a wheel center which includes a substantially thick and solid felly connected to a concentrically positioned hub. Wire spokes extend radially outward from the hub in circumferential array and have tenons or feet on inner ends thereof which are anchored within recesses at front and rear ends of the hub. Radially outer ends of the spokes are plain terminations welded in the shape of a plug anchor within circumferentially spaced bores in the felly to secure the spokes and permit wheel formations which exhibit the classic beauty and elegance of a suspension wire spoke wheel, combined with durability, strength and ease of construction.

3 Claims, 19 Drawing Figures

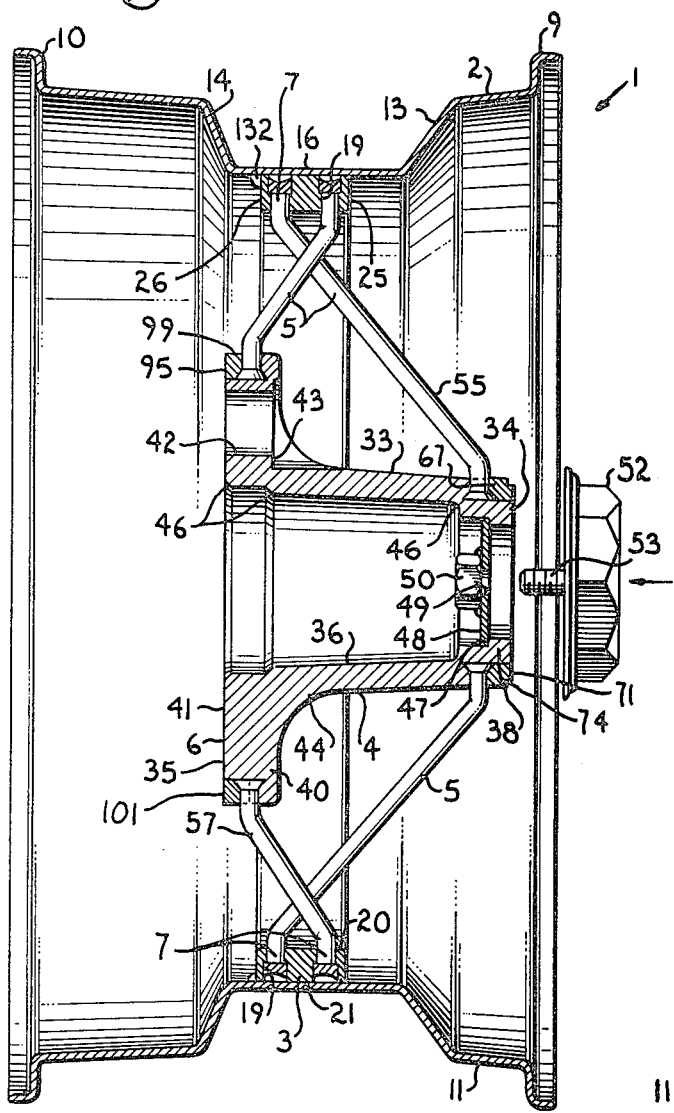
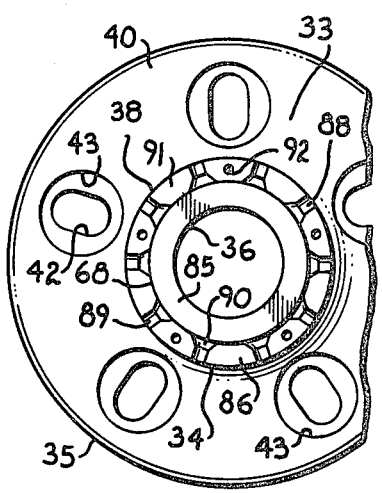
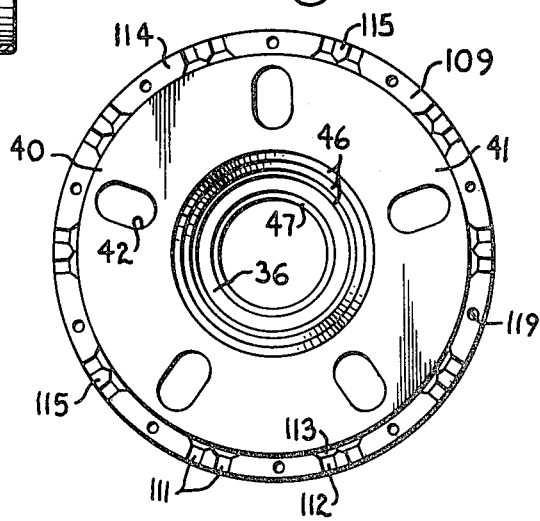
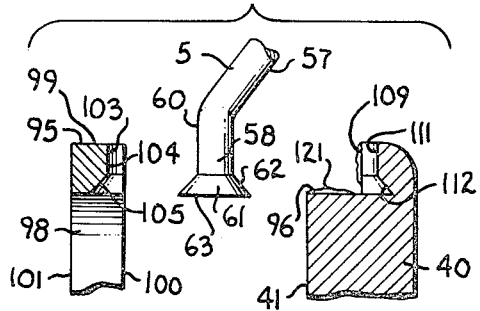

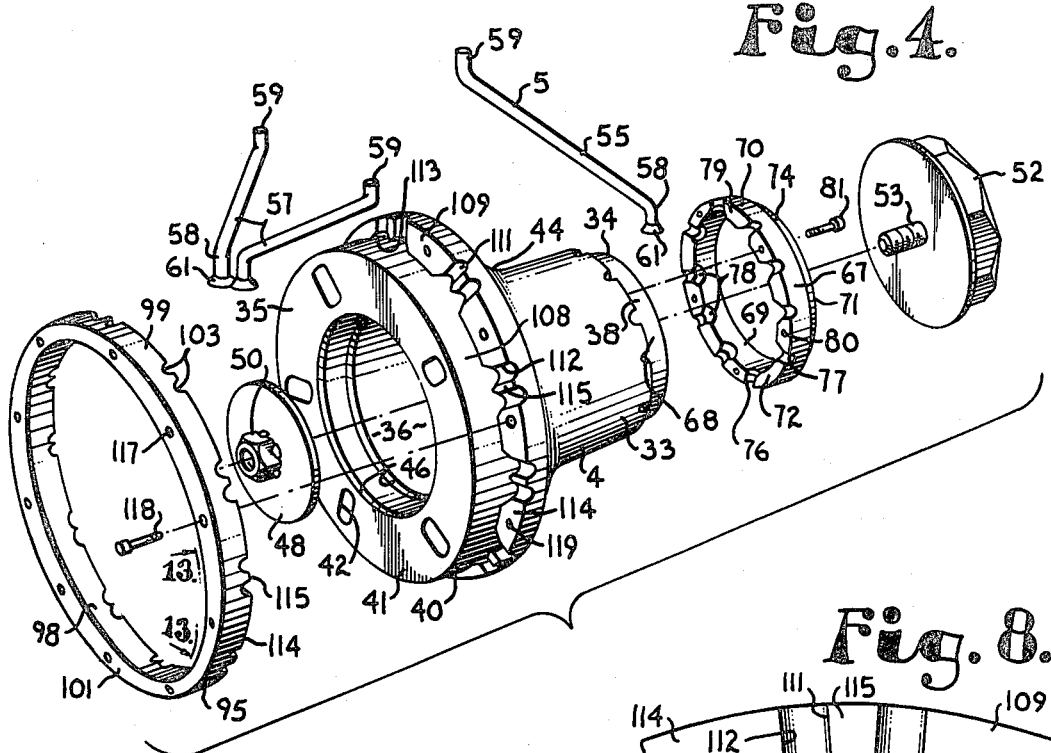

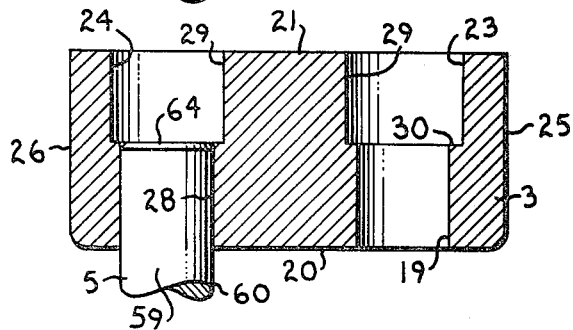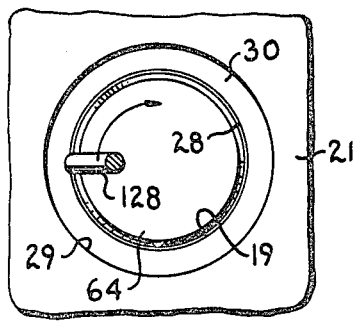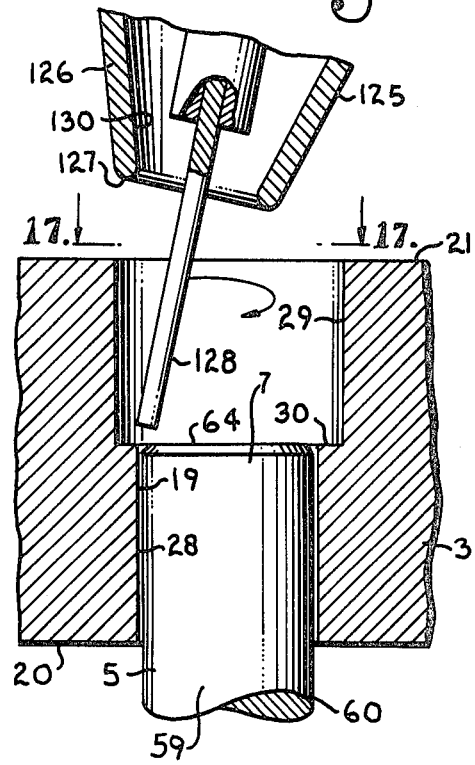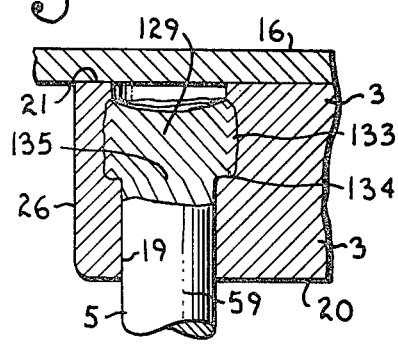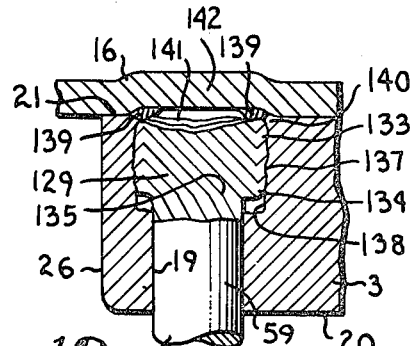

METHOD OF MANUFACTURING A WIRE SPOKE AUTOMOTIVE WHEEL

This is a division of U.S. application Ser. No. 918,606 filed June 23, 1978, now matured into U.S. Pat. No. 4,226,479.

This invention relates to inexpensively produced wire spoke wheels and particularly to such wheels especially suitable for use with conventional tubeless tires and which are sturdy and durable.

Heretofore, wire spoke automobile wheels which permit the use of tubeless tires have been difficult and costly to make. A typical method of manufacture involved the projection of wheel spoke nipple ends through holes in a rim drop center, which often interfered with maintaining a reliable and effective air-tight seal. In an effort to overcome this problem, structures have been suggested utilizing spoke ends which are connected to a felly mounted concentrically inwardly of the rim drop center. This makes a reliable mounting for tubeless tires, but is necessarily complex and expensive. Further, neither arrangement effectively confronts the predominate problems associated with the use of "suspension" wire spoke wheels; namely, original tension alignment or "tuning" and subsequent slackening or "detuning" of spokes after periods of use or striking resisting obstacles such as curbs, chuckholes and the like.

Moreover, the cost of manufacturing suspension wheels is inherently quite high because considerable handwork is required during the assembly and spoke tuning processes. Thus, a typical suspension wire wheel often costs over twice as much as a comparable, non-wire spoke, decorative wheel while being less durable.

Within the past few years, certain automotive wheel manufacturers have attempted to overcome the problems associated with wire suspension wheels by employing relatively rigid and non-tensioned bars extending radially between the hub and rim. Though functionally effective, these generally are heavier and do not have the consumer demand of a wire spoke wheel.

The principal objects of the present invention are: to provide a wire spoke wheel for tubeless tires having advantages of wire suspension wheels without many of the disadvantages; to provide such a wire spoke wheel utilizing an effective arrangement for securely connecting spoke inner ends to a tubular hub assembly; to provide such a wheel having novel part cooperation by which spoke outer ends are easily and securely connected to a felly; to provide such a wheel in which spokes interconnect a felly and a tubular hub assembly in an operably untensioned condition, avoiding tension tuning; to provide a method of spoke wheel manufacture in which outer ends of the spokes are plug anchored to the felly using novel spoke tip welding procedures; and to provide a wire spoke wheel which is relatively inexpensive to produce, sturdy and durable in use and adaptable to forms having particular beauty and consumer demand.

Other objects and advantages of this invention will become apparent from the following description taken in connection with the accompanying drawings wherein are set forth, by way of illustration and example, certain embodiments of the present invention.

FIG. 3 is a vertical cross-sectional view through the wheel taken along line 3—3, FIG. 2.

FIG. 4 is an exploded, perspective view of the wheel hub assembly.

FIG. 5 is a fragmentary front elevational view of the hub.

FIG. 6 is a rear elevational view of the rear of the hub.

FIG. 7 is an exploded fragmentary view of a portion of the hub assembly and showing aligned recesses for receiving footed spoke hub or inner ends.

FIG. 8 is an enlarged, fragmentary view showing paired spoke end receiving recesses in the hub rear.

FIG. 9 is an enlarged, fragmentary view of paired spoke hub or inner ends.

FIG. 10 is an enlarged, fragmentary, cross-sectional view taken along line 10—10, FIG. 9.

FIG. 11 is an enlarged, fragmentary, cross-sectional view taken along line 11—11, FIG. 9.

FIG. 15 is a greatly enlarged, fragmentary, cross-sectional view illustrating the insertion of a spoke outer end into a felly bore preparatory to welding for forming a connection therebetween.

FIG. 16 is a greatly enlarged, fragmentary view showing a section through a felly bore with welding apparatus in place.

FIG. 17 is a greatly enlarged, fragmentary view taken on the line 17-7, FIG. 16, showing the path taken by the welding rod tip during welding of a spoke outer end.

FIG. 18 is a greatly enlarged, fragmentary, cross-section view showing a welded plug connection between a spoke outer end and the felly, the felly being capped by a tubeless wheel rim.

FIG. 19 is a view similar to FIG. 18 but showing the plug connection broken by a severe blow but still retained within the felly.

REFERRING TO THE DRAWINGS IN MORE DETAIL

Figure 1:
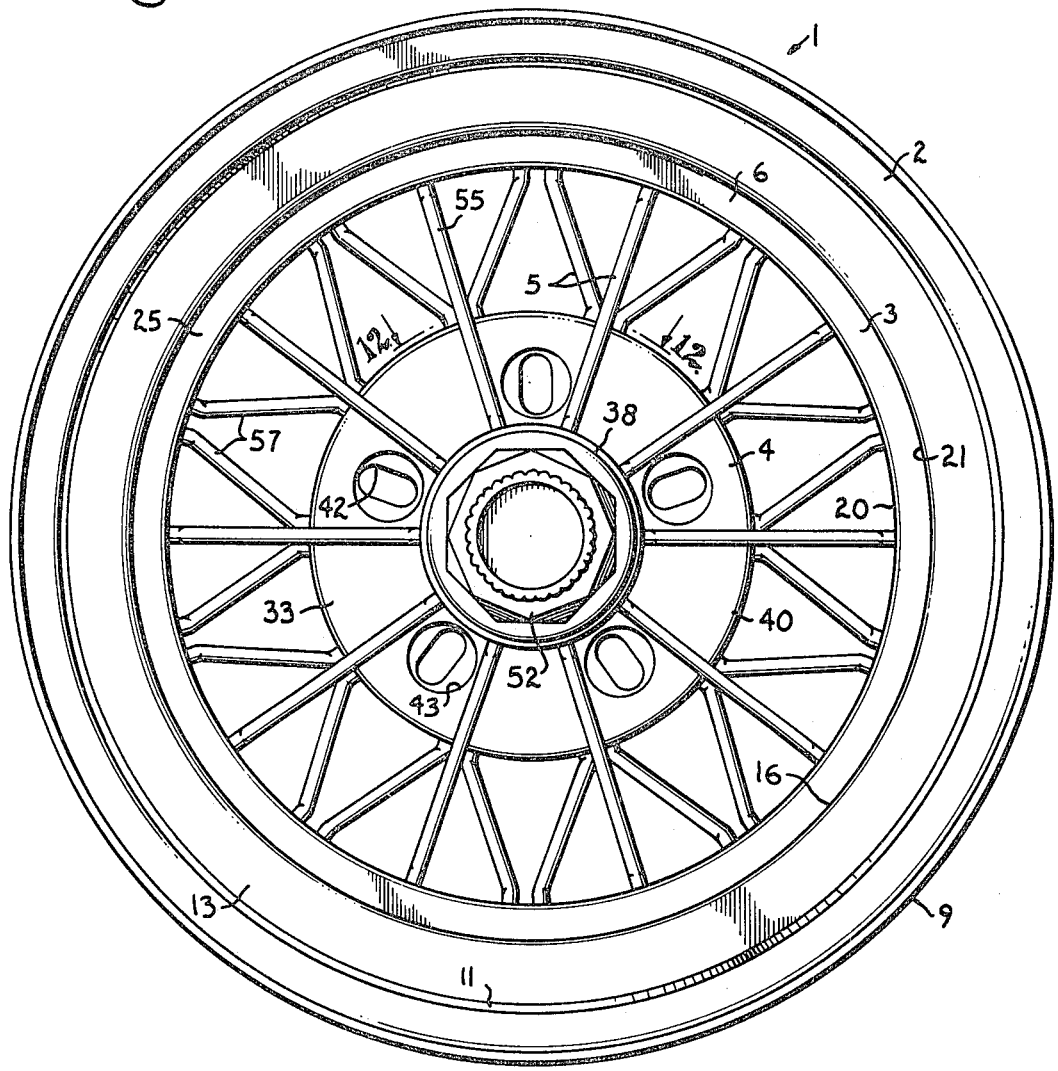
FIG. 1 is a front elevational view of a wire spoke wheel embodying the present invention.
Figure 12:
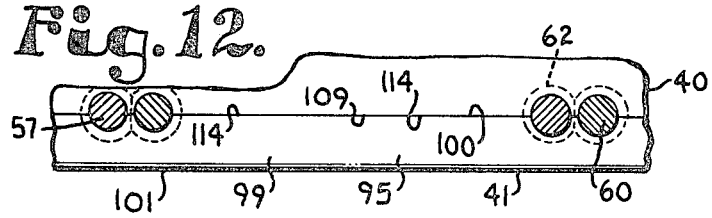
FIG. 12 is an enlarged, fragmentary, cross-sectional view taken along line 12—12, FIG. 1, showing details of the hub assembly.
Figure 13:
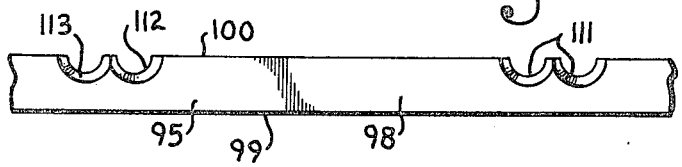
FIG. 13 is an enlarged, fragmentary, cross-sectional view taken along line 13—13, FIG. 4, showing details of a hub rear ring member.

The reference numeral 1 generally indicates a wire spoke wheel embodying the present invention. The wheel 1 includes an outer tubeless tire rim 2, a felly 3 mounted concentrically inwardly of the rim 2 and a hub assembly 4 positioned concentrically inwardly of the rim 2. Operably untensioned wire spokes 5 interconnect the hub assembly 4 and the felly 3 in a circumferential array and therewith form a wheel center 6 which is connected to the tire rim 2.

As best seen in FIG. 3, the tire rim 2 includes front and rear tire bead seats 9 and 10 and front and rear inclined walls 13 and 14 which extend into a reduced diameter portion or so-called drop center 16. The shape of the tire rim 2 is conventional to a modern tubeless tire and permits an air-tight or leak-free seal therewith. A port (not shown) through a front inner wall portion 11 is provided for an inflation valve (not shown).

The felly 3 is mounted concentrically inwardly of the drop center 16 and, in this example is formed of a length of solid, rolled, strap steel welded into a hoop, providing strength and rigidity for the wheel assembly. A plurality of bores 19 extend exircumferentially around and radially through the felly 3 at predetermined positions for receiving and anchoring radially outer ends 7 of the wire spokes 5 as described below. The felly 3 has inner and outer annular surfaces 20 and 21 of which the outer surface 21 is conformingly mounted to the drop center 16.

Figure 14:
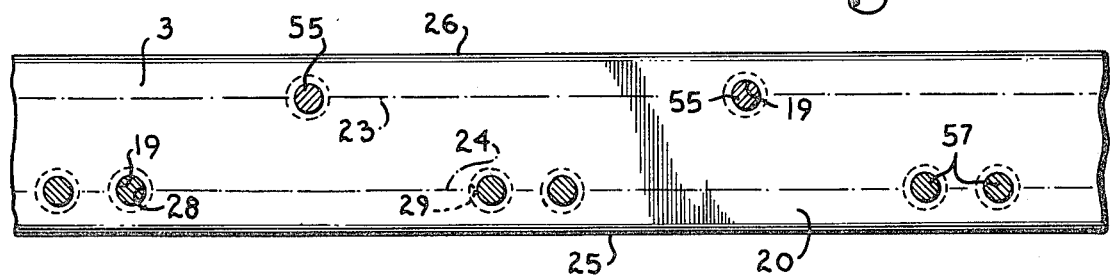
FIG. 14 is an enlarged, fragmentary, cross-sectional view showing the connection between the ends of the spokes and the felly, taken along line 14—14, FIG. 2.

As shown in FIG. 14, the bores 19 are aligned in a first row 23 adjacent a rear edge 26 of the felly and a second row 24 adjacent a front edge 25 thereof. The rear row 23 is formed of single, spaced bores 19 whereas the front row 24 is made up of spaced-apart pairs thereof.

The bores 19, FIGS. 15-16, extend through the felly 3 from the inner annular surface 20 to the outer annular surface 21 and include a bore portion 28 of lesser diameter and a co-axial counterbore portion 29 of greater diameter which extends inwardly from the outer annular surface 21 approximately half of the thickness of the felly 3. The juncture between the counterbore portion 29 and the bore portion 28 forms an interior circular shoulder 30.

The hub assembly 4, FIG. 4, includes a hub piece 33 formed of material sufficiently strong to resist the applied loads, such as steel, die-cast aluminum alloy or the like. The hub piece 33 exhibits front and rear ends 34 and 35, an axial bore 36 extending therethrough and front and rear flange sections 38 and 40 to which the inner ends of the spokes 5 are connected as described below. To provide a relatively broad face 41, for planar engagement with the surface of the vehicle hub, and to provide ample space for elongated lug holes 42, the rear flange section 40 is of substantially greater radial extent than the front connecting flange section 38. Indented or recessed areas 43 in the flange 40, and surrounding the lug holes 42, permit emplacement of conventional washers (not shown) with either a centered or an offset bore for universally mounting the wheel 1 to various pattern vehicle hubs.

The exterior surface 44 of the hub piece 33 tapers radially outwardly and smoothly toward the rear flange 40. Additionally, the hub bore 36 includes a series of steps or tapered shoulders 46 which vary the inside diameter as needed for sufficient wall strength with minimum weight. An interior shoulder 47, located adjacent the hub front end 34, provides an abutment surface for engagement with a retaining plate 48 having an axial bore 49 communicating with a fastener, such as a nut 50, affixed to the plate as by welding. A decorative hubcap 52 has a bolt shank or threaded post 53 mounted on the backside thereof for engagment with the nut 50, the mount the hubcap 52 over the front end 34.

In the illustrated example, the wire spokes 5 are formed of a suitable material, such as steel, and include front spokes 55 and rear spokes 57 which have respective angled shafts 60 with radially inner ends 58 and outer ends 59, FIG. 4. The inner ends 58 have enlarged tenions or feet 61 with outwardly inclined surfaces 62 and a flat bottom or base 63 arranged in a circular wedge shape. The front spokes 55 are each singly arranged and the rear spokes 57 are joined together at adjacent feet 61 in conformance with the structure discussed above in connection with FIG. 14. The outwardly inclined upper surfaces 62 merge togehter adjacent the peripheries thereof in a juncture 65, FIGS. 9-11.

Figure 2:
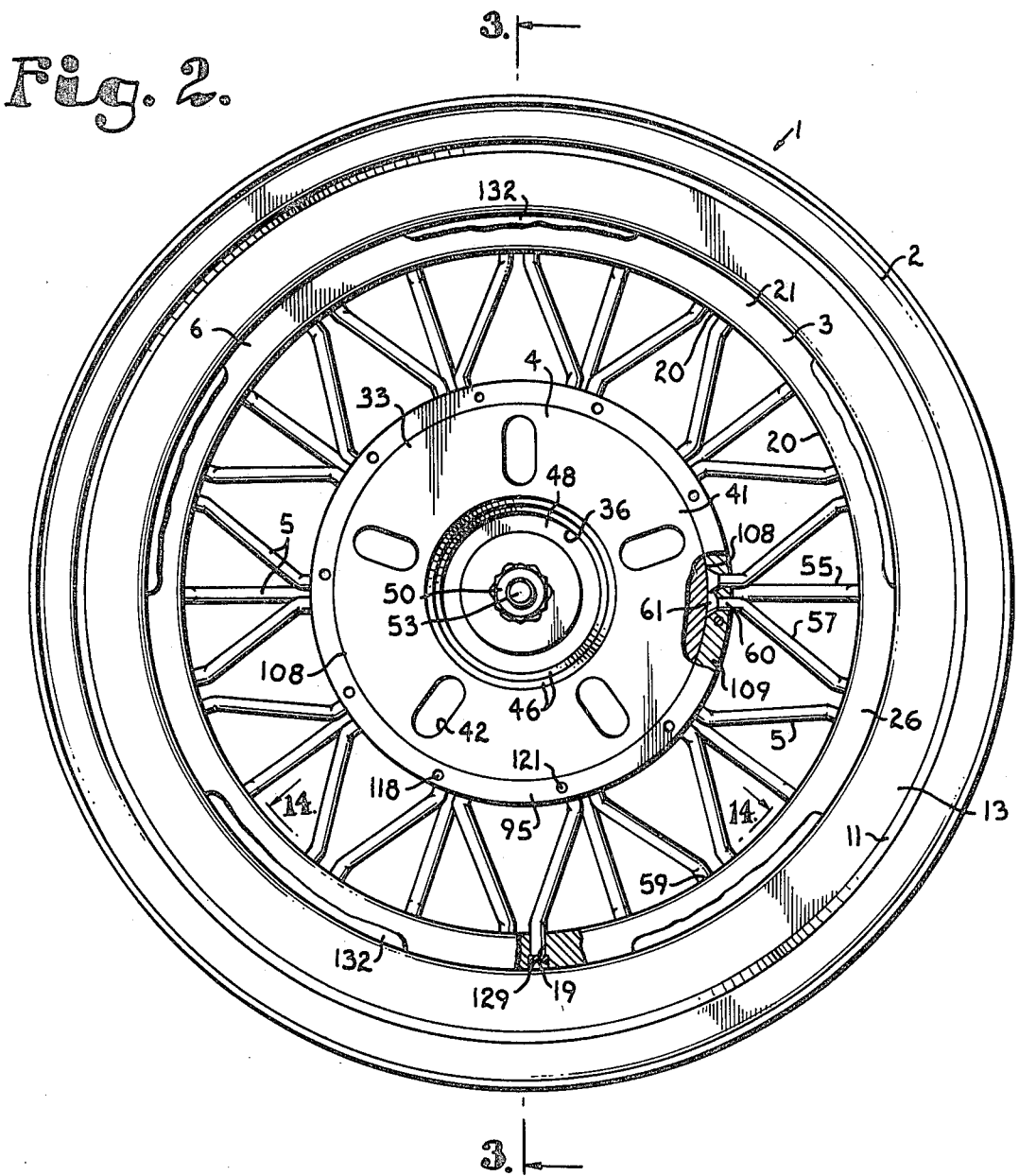
FIG. 2 is a rear elevational view of the wheel with portions broken away to show internal construction.

As best shown in FIGS. 1 and 2, there are thirty spokes 5 in the exemplary wheel 1 and the front spokes 55 are of greater length than the rear spokes 57 in order to reach the felly 3 from an axially forward and greater radially inward position, FIG. 3. The spoke outer ends 59, noted above are plain terminations; that is, extended or expanded portions, but rather, a plain end surface 64, FIG. 15, which is preferably chamfered or broken at the rounded edge.

The inner and outer ends 58 and 59 are each terminations of legs or shafts 60 bent so that the respective ends 58 and 59 extend substantially radially into the felly 3 and hub 4, although the balance of the spokes extend at various angles to the radial as shown in FIGS. 1 and 3. The front spokes 55 project between the front connecting flange 38 and the row 23 of bores 19 adjacent the felly rear edge 26. Conversely, the rear spokes 57 extend from the rear flange 40 to the row 24 of paired bores 19 adjacent the felly front edge 25, crossing the front spokes 55, FIG. 3.

The hub front connecting flange section 38 includes means engaging and anchoring the radially inner ends 58 of the front spokes 55. In the illustrated example, the front connecting flange section 38 receives a front ring member 67 which is telescopically sleeved over the cylindrical shoulder 68 of the hub end 34. The front ring member 67 has inner and outer cylindrical surfaces 69 and 70 and front and rear radial edges or walls 71 and 72. The front edge or wall 71 has a peripheral chamfer or shoulder 74 thereon.

Circumferentially spaced around the front ring member rear edge or wall 72 are mortises or recesses 76 for receiving a portion of the spoke inner ends 58, each such mortise or recess having a partial bore portion 77 and an inclined foot portion 78 corresponding in dimension to the spoke shaft 60 and the tenon or foot 61. Land portions 79 comprise raised areas between the mortises or recesses 76 and lie adjacent to corresponding portions in the front shoulder 68, described below, when the front ring member 67 is sleeved over the hub front end 34. A plurality of bores 80, five thereof in the illustrated example, extend through the front ring member 67, from the front edge or wall 71 to the rear edge or wall 72, and terminate within a land portion 79 for receipt of fasteners, such as Allen head bolts 81, which recess thereinto and urge the front ring member 67 toward a front hub wall 86, FIG. 5.

The front hub wall 86 extends radially outwardly from the cylindrical surface 68 and has, in coordination with the configuration of the front ring member 67, a plurality of mortises or recesses 88 arranged circumferentially therearound which include bore portions 89 and inclined foot portions 90. Land portions 91 between the mortises or recesses 88 have bores 92 for receipt of the fasteners 81. The front spoke inner ends 58 are trapped within opposite paired mortises or recesses 76 and 88 with the spoke shaft 60 held between the bore portions 77 and 89 and the tenon or foot 61 locked within the foot portions 78 and 90. It will be appreciated that the spokes 55 are thereby securely anchored to the hub front end 34 and cannot be pulled therefrom except by a force great enough to fracture or deform the cooperating structure. Conversely, compressive loads on the front spokes 55 toward the hub front end 34 is effectively resisted.

An arrangement similar to that of the hub front end 34 is provided at the hub rear end 35. A rear ring member 95 telescopically mounts over a rear cylindrical surface shoulder 96 on the hub 4 and includes spaced mortises or recesses 103 for receiving paired radially inner ends 58 of the rear spokes 57. In the illustrated example, the rear ring member 95 includes inner and outer cylindrical surfaces 98 and 99 and front and rear radial edges or walls 100 and 101. A plurality of said paired mortises or recesses 103 are spaced circumferentially around the front edge or wall 100 and have bore portions 104 and foot portions 105 for respective receipt of the spoke shaft 60 and the tenon or foot 61. The rear shoulder 96 extends to a radial rear edge or face 109 having coordinatingly positioned and aligned paired mortieses or recesses 111 with bore portions 112 and foot portions 113. Lands 114 separate and space each pair of mortises or recesses 111 and relatively smaller area lands 115 separate the individual recesses of the pairs.

A plurality of spaced bores 117, numbering ten thereof in the illustrated example, extend through the rear ring member 95 from the front edge or wall 100 to the rear edge or wall 101 for receipt of fasteners such as recessed Allen head bolts 118 which further engage within bores 119 in the lands 114 of the rear face 109.

Like the connecting means of the front ring member 67, the inner ends 58 of the paired rear spokes 57 are received within the rear edge or face mortises or recesses 111 and, when the rear ring member 95 is sleeved over the outer surface 96, the rear ring member mortises or recesses 103 fit around the joined spoke inner ends 58. Concurrently, the opposite lands 114 and 115 are positioned adjacent their aligned counterpart lands and the rear spokes ends 58 are thereby securely anchored or trapped within the hub rear end 35.

In the manufacture of the wire spoke wheel 1, the center 6 is first assembled as described below and then mounted within the tubeless tire rim 2. To assemble the wheel center 6, the hub piece 33 is centered within the felly 3 by the use of a mounting jig (not shown). The front and rear spokes 55 and 57 are connected at their inner ends 58 to the hub piece 33 and the spoke outer ends 59 are inserted into the felly bores 19 in the respective rows 23 and 24.

It is preferred that the dimensions of the receiving recesses provide snug engagement with the spoke shafts 60 when the latter are fitted therein. Further, it is preferred that there be suitable clearances, e.g., 0.003" to 0.005" between the various facing surfaces of the rings 95 and 67 and the hub piece 33 to permit application of a bonding substance or agent 121, such as a low viscosity epoxy or the like, therebetween. In addition to improving the mechanical connections, this helps anchor and prevent unwanted play in the spokes 5. Further, after the fasteners 81 and 118 are inserted and tightened, the bonding agent 121 is preferably applied to fill in recessed bolt cavities to secure the fasteners 81 and 118 against rotation and prevent tampering after assembly.

The outer ends 59 of the spokes 5 extend radially approximately halfway through the felly 3 to a position approximately even with the interior shoulder 30 of the bore 19, FIG. 15. The spoke outer ends 59 are then anchored within the bore 19 by an electric current welding process utilizing a rosette-forming bead welding device 125. The welding device 125 includes a hollow casing feeder 126 from which is fed a welding wire 128 of mild steel or the like. The welding device 125 is part of a larger apparatus (not shown) which causes the device 125 to rotatively wobble whereby the end of the wire 128 traverses a circular path (FIG. 17) as it continuously extends into the counterbore portion 29 of the bore 19. In the illustrated example, the welding wire 128 is approximately of 0.035" diameter and is fed from the tip 127 of the welding device 125 at a rate of approximately five inches per second. Additional, a circular channel 130 which rings the welding wire 128, transmits therealong a gas mixture, such as 95% argon and 5% carbon dioxide, which acts as an inert shield around the welding wire 128 to avoid contamination of the weld.

In forming the weld, the welding wire 128 is inserted into the counterbore portion 29 and then moved in the noted rotative-wobble pattern to produce a "rosette" or coiled, circular, bead weld formation 129 atop the spoke outer end 59. The formation 129 is fused both to the spoke top surface 64 and the wall of the counterbore portion 29 and roughly constitutes a plug which laterally fills the cavity and blends with adjacent surfaces at 133, 134 and 135, FIG. 18. Accordingly, the fused or blended portions 133, 134 and 135 extend substantially into the material of the felly 3 and spoke outer end 59 and securely anchor the spoke within the felly.

After assembly, the wheel center 6 is mounted within the tire rim 2. The diameter of the felly 3 is preferably slightly oversize relative to the interior of the tire rim 2 to provide a tight fit for pressing the wheel center 6 into the tire rim 2. Using a truing apparatus, the wheel center 6 is adjusted for correct positioning within the tire rim 2 and tested for both lateral and radial run-out. The felly 3 is then welded along the outer periphery of rear edge 26 to the interior of the drop center 16. The resultant weld beads 132 may be relatively short segments, as illustrated, or may be a continuous weld. The wheel is cleaned and preferably chrome plated and polished to increase corrosion resistance and provide a pleasing appearance.

The hub cap 52 is mounted next to the front connecting flange section 38, and centered on the ring member shoulder 74, in order to keep out road dirt and grime and may be pleasingly decorated with, for example, the wheel manufacturer's mark or emblems designating the maker of the automobile.

It should be appreciated that, in the event of a substantial collision with a resisting object, such as pothole wall, curb, or the like, which produces strain loads beyond the elastic limit of the wheel material, a fracture or break must result. However, due to the above noted construction, such a fracture or break in the spoke-felly engagement area is not likely to produce the dangerous situation which exists when the spokes and felly separate. FIG. 18 shows the normal completed spoke-felly connection, described above. FIG. 19 somewhat schematically, illustrates the results of a severe blow where the radially outward force on a spoke 5 has been great enough to cause a material failure. The weld formation 129, or plug, has torn away from the felly base along slip faults 137 and jammed into the rim drop center 16, where it produced a deformation in the form of a bulge 142. In so doing, the plug top 141 has partially disintegrated adjacent felly material at 140 creating trapped debris 139. The extent of plug displacement is indicated by the space which may be created below the plug surface 134 at 138, FIG. 19. Although a structural failure has occurred, and the wheel is probably no longer sufficiently concentric for long term use, the damaged wheel is not likely to be dangerous for short term use since subsequent forces tending to pull the spoke from the felly are resisted by the engagement of the plug with the remmants of the interior bore shoulder 30.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A method of manufacturing a vehicular wheel rim comprising the steps of:
   (a) providing a wire spoke vehicular wheel rim;
   (b) providing a felly for said wheel rim and having walls defining spaced bores extending circumferentially therearound;
   (c) providing solid spokes having radially outer ends;
   (d) securing said spoke outer ends within said felly bores by:
      (1) inserting a spoke outer end partially within a felly bore, thereby leaving a cavity defined by said felly bore atop said spoke outer end with said spoke outer end providing a substantially closed bottom wall of said cavity;
      (2) feeding a welding wire into said cavity under wire melting conditions;
      (3) substantially filling said cavity with melted welding wire but not overfilling said cavity;
      (4) producing a weld formation extending transversely across said spoke outer end;
      (5) fusing said spoke outer end to said melted welding wire which is fused to the felly bore wall; and
   (e) assembling the wheel rim and felly-spoke assembly.

2. The method as set forth in claim 1 including the step of:
   (a) substantially filling said cavity with said weld formation, thereby forming a plug within said cavity and fused atop said spoke outer end.

3. The method as set forth in claim 1 including the step of:
   (a) positioning said wire atop said spoke outer end; and
   (b) moving said wire in a circular path within said cavity while feeding said wire.

* * * * *